(12) United States Patent
Shnier

(10) Patent No.: US 7,017,120 B2
(45) Date of Patent: Mar. 21, 2006

(54) METHODS FOR CREATING A CUSTOMIZED PROGRAM FROM A VARIETY OF SOURCES

(76) Inventor: J. Mitchell Shnier, 25 Lower Links Road, Toronto On (CA) M2P 1H5

( * ) Notice: Subject to any disclaimer, the term of this patent is extended or adjusted under 35 U.S.C. 154(b) by 774 days.

(21) Appl. No.: 09/994,732

(22) Filed: Nov. 28, 2001

(65) Prior Publication Data

US 2002/0049974 A1    Apr. 25, 2002

(30) Foreign Application Priority Data

Oct. 5, 2000   (CA)   .................................. 2327632

(51) Int. Cl.
*G06F 3/00*    (2006.01)
(52) U.S. Cl. ........................ 715/783; 700/94
(58) Field of Classification Search .................. 700/94; 345/783
See application file for complete search history.

(56) References Cited

U.S. PATENT DOCUMENTS

| 5,721,827 | A | 2/1998 | Logan et al. |
| 5,892,536 | A | 4/1999 | Logan et al. |
| 5,986,692 | A | 11/1999 | Logan et al. |
| 6,038,591 | A | 3/2000 | Wolfe et al. |
| 6,088,455 | A | 7/2000 | Logan et al. |
| 6,119,076 | A * | 9/2000 | Williams et al. ............. 340/3.1 |
| 6,544,295 | B1 * | 4/2003 | Bodnar ...................... 709/219 |
| 6,678,215 | B1 * | 1/2004 | Treyz et al. .................. 368/10 |
| 2002/0133247 | A1 * | 9/2002 | Smith et al. .................. 700/94 |
| 2003/0093790 | A1 * | 5/2003 | Logan et al. ............... 345/783 |

OTHER PUBLICATIONS

Bott, Special Edition Using Microsoft Windows Millennium Edition, Chapter 14—"Playing and Recording Digital Music" (Que Publishing, Nov. 3, 2000).*

* cited by examiner

*Primary Examiner*—Heather R. Herndon
*Assistant Examiner*—Doug Hutton

(57) ABSTRACT

The invention provides a method and system for defining a personalized sequence of discrete media content segments to be played at particular times. The media content segments are selected from live media content segments and archived media content segments. The method includes specifying an order of play of the media segments; specifying specific live media content segments having defined start times, durations and repeat intervals; and deriving a play sequence. The media content segments may be audio or video content segments. The system in a preferred embodiment is carried out using a series of web pages and the content defined by the sequence is provided to the user over a computer network.

6 Claims, 17 Drawing Sheets

---

Specify the Play Order and Save Program, or Select More Audio Segments

| Play Order | Listen Now | Segment Title (click for web page) | Segment Duration (hh:mm:ss) | Start Time (hh:mm:ss AM) | Repeat Interval (hh:mm:ss) | Listening Time (hh:mm:ss) |
|---|---|---|---|---|---|---|
| | ¤ | 680 News Business Report | Live | 12:26:00 AM | 0:30:00 | 0:02:00 |
| | ¤ | 680 News News Update | Live | 12:03:00 AM | 0:15:00 | 0:03:00 |
| | ¤ | Toronto Stock Market Alerts | Live | As Available | None | All |
| | ¤ | Jerry Baker - Gardening For Life | 0:55:02 | 3:00:00 PM | 24:00:00 | All |
| 4 | ¤ | 1050 Chum Oldies Radio | Live | In Sequence | None | All |
| 2 | ¤ | NPR Hourly News | 0:05:00 | In Sequence | None | All |
| 3 | ¤ | NPR's Car Talk Show | 0:07:36 | In Sequence | None | All |
| 1 | ¤ | Bloomberg Business News | 0:02:00 | In Sequence | None | All |

☐ Check this box if you'd like this program to be automatically repeated

[Select More Audio Segments]

[Save Program]

To prepare to submit a new audio segment to the database, paste the audio segment's URL below, and click on Get Details Paste audio URL here http://www.1050chum.com/Content/AudioVideo/CHUMAM_1.ram — 502

501

Get Details — 503

*FIG. 5*

Here are the details for the requested audio source, provide additional information if desired, and submit this to the central database Audio URL: http://www.1050chum.com/Content/AudioVideo/CHUMAM_1.ram — 601
Page URL: http://www.1050chum.com/1050CHUMSet.cfm — 602
Audio URL File Contents: rtsp://209.226.148.226:665/encoder/chumam — 603
604 — Title: 1050 CHUM TORONTO
605 — Author: OLDIES RADIO
606 — Copyright: ©2000 CHUM LIMITED
607 — Length: Live
Segment Title — 608
Keywords — 609
610 — Start Time
Duration — 611
612 — Repeat Interval
Days Available — 613
614 — Time Zone
Update frequency — 615

Submit To Central Database — 616

FIG. 6

Here are the details for the requested audio source, provide additional information if desired, and Submit this to the central database

| Field | Value | Ref |
|---|---|---|
| Audio URL | http://www.1050chum.com/Content/AudioVideo/CHUMAM_1.ram | 701 |
| Page URL | http://www.1050chum.com/1050CHUMSet.cfm | 702 |
| Audio URL File Contents | rtsp://209.226.148.226:665/encoder/chumam | 703 |
| Title | 1050 CHUM TORONTO | 704 |
| Author | OLDIES RADIO | 705 |
| Copyright | ©2000 CHUM LIMITED | 706 |
| Length | Live | 707 |
| Segment Title | 1050 Chum Hourly News Update | 708 |
| Keywords | Toronto, Canada, News, 1050, Chum, Hourly | 709 |
| Start Time | Midnight | 710 |
| Duration | 00:04:00 | 711 |
| Repeat Interval | 1:00:00 | 712 |
| Days Available | All | 713 |
| Time Zone | GMT -05:00 Eastern Time | 714 |
| Delay | 0:00:30 | 715 |

Submit To Central Database — 716

FIG. 7

Select the segments of interest, and click on Include to continue

| Select | Listen Now | Segment Title (click for web page) | Segment Duration (hh:mm:ss) | Start Time (hh:mm:ss AM) | Repeat Interval (hh:mm:ss) | Listening Time (hh:mm:ss) |
|---|---|---|---|---|---|---|
| ☐ | ¤ | 680 News | Live | In Sequence | None | All |
| ☐ | ¤ | 680 News Sports Report | Live | 12:15:00 AM | 0:30:00 | 0:03:00 |
| ☐ | ¤ | 680 News Business Report | Live | 12:26:00 AM | 0:30:00 | 0:02:00 |
| ☐ | ¤ | 680 News Weather Report | Live | 12:02:00 AM | 0:10:00 | 0:01:30 |
| ☐ | ¤ | 680 News Lottery Results | Live | 12:59:00 AM | 1:00:00 | 0:01:00 |
| ☐ | ¤ | 680 News News Update | Live | 12:03:00 AM | 0:15:00 | 0:03:00 |
| ☐ | ¤ | 680 News Stock Market Update | Live | 9:08:00 AM | 0:30:00 | 0:01:30 |
| ☐ | ¤ | Toronto Stock Market Alerts | Live | As Available | None | All |
| ☐ | ¤ | CFRB News Update | Live | 12:00:00 AM | 0:30:00 | 0:04:30 |
| ☐ | ¤ | 1050 Chum Hourly News Update | Live | 12:00:00 AM | 1:00:00 | 0:04:00 |
| ☐ | ¤ | Jerry Baker – Gardening For Life | 0:55:02 | In Sequence | None | All |
| ☐ | ¤ | Environmental News Network | 0:04:39 | In Sequence | None | All |

Include Selected Segments In Program

*FIG. 9*

Select the segments of interest, and click on Include to continue

| Select | Listen Now | Segment Title (click for web page) | Segment Duration (hh:mm:ss) | Start Time (hh:mm:ss AM) | Repeat Interval (hh:mm:ss) | Listening Time (hh:mm:ss) |
|---|---|---|---|---|---|---|
| ☐ | ¤ | 680 News | Live | In Sequence | None | All |
| ☐ | ¤ | 680 News Sports Report | Live | 12:15:00 AM | 0:30:00 | 0:03:00 |
| ☑ | ¤ | 680 News Business Report | Live | 12:26:00 AM | 0:30:00 | 0:01:30 |
| ☐ | ¤ | 680 News Weather Report | Live | 12:02:00 AM | 0:10:00 | 0:01:30 |
| ☑ | ¤ | 680 News Lottery Results | Live | 12:59:00 AM | 1:00:00 | 0:01:00 |
| ☐ | ¤ | 680 News News Update | Live | 12:03:00 AM | 0:15:00 | 0:03:00 |
| ☑ | ¤ | 680 News Stock Market Update | Live | 9:08:00 AM | 0:30:00 | 0:01:30 |
| ☐ | ¤ | Toronto Stock Market Alerts | Live | As Available | None | All |
| ☐ | ¤ | CFRB News Update | Live | 12:00:00 AM | 0:30:00 | 0:04:00 |
| ☐ | ¤ | 1050 Chum Hourly News Update | Live | 12:00:00 AM | 1:00:00 | 0:04:00 |
| ☑ | ¤ | Jerry Baker - Gardening For Life | 0:55:02 | 3:20:00 PM | 24:00:00 | All |
| ☐ | ¤ | Environmental News Network | 0:04:39 | In Sequence | None | All |

Include Selected Segments In Program

*FIG. 10*

Select More Audio Segments or continue by clicking on Save Program

| Listen Now | Segment Title (click for web page) | Segment Duration (hh:mm:ss) | Start Time (hh:mm:ss AM) | Repeat Interval (hh:mm:ss) | Listening Time (hh:mm:ss) |
|---|---|---|---|---|---|
| ¤ | 680 News Business Report | Live | 12:26:00 AM | 0:30:00 | 0:01:30 |
| ¤ | 680 News News Update | Live | 12:03:00 AM | 0:15:00 | 0:03:00 |
| ¤ | Toronto Stock Market Alerts | Live | As Available | None | All |
| ¤ | Jerry Baker - Gardening For Life | 0:55:02 | 3:20:00 PM | 24:00:00 | All |

☐ Check this box if you'd like this program to be automatically repeated

Select More Audio Segments

Save Program

*FIG. 11*

Specify the Play Order and Save Program, or Select More Audio Segments

| Play Order | Listen Now | Segment Title (click for web page) | Segment Duration (hh:mm:ss) | Start Time (hh:mm:ss AM) | Repeat Interval (hh:mm:ss) | Listening Time (hh:mm:ss) |
|---|---|---|---|---|---|---|
|  | ¤ | 680 News Business Report | Live | 12:26:00 AM | 0:30:00 | 0:02:00 |
|  | ¤ | 680 News News Update | Live | 12:03:00 AM | 0:15:00 | 0:03:00 |
|  | ¤ | Toronto Stock Market Alerts | Live | As Available | None | All |
|  | ¤ | Jerry Baker - Gardening For Life | 0:55:02 | 3:00:00 PM | 24:00:00 | All |
| 4 | ¤ | 1050 Chum Oldies Radio | Live | In Sequence | None | All |
| 2 | ¤ | NPR Hourly News | 0:05:00 | In Sequence | None | All |
| 3 | ¤ | NPR's Car Talk Show | 0:07:36 | In Sequence | None | All |
| 1 | ¤ | Bloomberg Business News | 0:02:00 | In Sequence | None | All |

☐ Check this box if you'd like this program to be automatically repeated

Select More Audio Segments

Save Program

*FIG. 13*

Specify a name for your program, and a time window when you want it to be enabled, and save it

| Save As Program | Record Program | Program Name (click to listen now) | Number of Segments | Listen Window | | |
|---|---|---|---|---|---|---|
| | | | | From (hh:mm:ss AM) | To (hh:mm:ss AM) | Days of Week |
| A | ☐ | My morning radio | 3 | 4:00:00 AM | Noon | Mon - Fri |
| B | ☐ | Bedtime radio | 7 | 7:00:00 PM | 2:00:00 AM | Mon - Fri |
| C | ☑ | Weekend | 8 | Midnight | Midnight | Sat - Sun |
| D | ☐ | << empty >> | << empty >> | | | |

Listen Now

Create Another Program

View Program Details

FIG. 14

Here are the details for your Dinnertime Radio program

| Now Playing | Segment Title (click for web page) | Segment Duration (hh:mm:ss) | Start Time (hh:mm:ss AM) | Repeat Interval (hh:mm:ss) | Listening Time (hh:mm:ss) |
|---|---|---|---|---|---|
| | Bloomberg Business News | 0:02:00 | In Sequence | None | All |
| | NPR Hourly News | 0:05:00 | In Sequence | None | All |
| | NPR's Car Talk Show | 0:07:36 | In Sequence | None | All |
| Interrupted | 1050 Chum Oldies Radio | Live | In Sequence | None | All |
| | 680 News News Update | Live | 12:03:00 AM | 0:15:00 | 0:03:00 |
| 0:01:32 | 680 News Business Report | Live | 12:26:00 AM | 0:30:00 | 0:02:00 |
| | Toronto Stock Market Alerts | Live | As Available | None | All |
| | Jerry Baker - Gardening For Life | 0:55:02 | 3:00:00 PM | 24:00:00 | All |

Program will not be automatically repeated

View Summary Of All Programs

Audio Player Control

Stop    Pause    Start

Play Previous    Skip Ahead    Skip to Next

FIG. 15

METHODS FOR CREATING A CUSTOMIZED PROGRAM FROM A VARIETY OF SOURCES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to methods for creating a customized audio or video program from a variety of digitized content sources.

Now that the Internet, and other networks, make a wide variety of digitized content electronically available, there is the need and capability to provide a selection and scheduling system to automate choosing among these to create a customized stream of material of interest to listeners, from a wide variety of content sources. Prior art has proposed several solutions.

For example, U.S. Pat. No. 6,038,591 to Wolfe et al. discloses a system which can distribute customized music selections to users, according to listener preferences and other factors. However, this system cannot utilize live feeds as sources, cannot interrupt a first audio source with a second audio source, and does not allow the user to make specific audio content selections.

U.S. Pat. No. 5,721,827 to Logan et al. discloses a system for distributing information to users, where said information could be in digitized audio form. However, the audio can only be that stored on the single said system, and the audio does not include live feeds.

U.S. Pat. Nos. 5,892,536, 5,986,692, and 6,088,455 to Logan et al. disclose systems for generating a proprietary program signal according to topics of interest to an individual. However, the system only monitors a single broadcast signal, and according to an analysis of the broadcast signal or a communication system which carries information on the characteristics of said broadcast signal, indicates when the broadcast signal has a topic of interest. There is no capability of selecting from a variety of digitized content providers, no capability of the user equipment specifying the source of the broadcast signal, and no capability of interrupting the broadcast signal from a first signal source with the broadcast signal from a second signal source.

There are world wide web sites currently available that enable a user to construct an audio program from selections made at their web site. For example, www.audiobasket.com provides a variety of Internet-based audio sources, however, it does not track what listeners have already heard (so going back to the site too soon to listen again results in the exact same audio being heard), it does not allow listening to live audio (so you cannot listen to a radio station in real-time), and you cannot interrupt one segment with another. Other sites, such as www.kerbango.com, www.sonicbox.com, and www.penguinradio.com, allow you to listen to real-time radio and other audio feeds, but have no way to interrupt one audio program with another, have no information on when particular types of information are presented on the audio feeds, and have no way to build lists of sources to sequentially receive according to a schedule. Another site, www.voquette.com, allows both archived and real-time audio to be received in sequence, but again, real-time audio cannot be interrupted at particular times, there is no information on when audio sources have particular types of information available, and there is no way to select a web page of archived audio segments, and later listen to them, one at a time.

SUMMARY OF THE INVENTION

A method of playing discrete media content segments according to the present invention comprises:
  specifying an order of play of media content segments selected from archived media content segments and continuously playing live media content segments,
  specifying specific live media content segments having defined start times, durations and repeat intervals,
  deriving a play sequence based on said order of play which is interrupted to accommodate said specific live media content segments at the start times thereof, and
  using said play sequence to provide a personalized sequence of discrete media content segments.

In a preferred aspect of the invention, the media content segments are streaming media content segments.

In a further aspect of the invention, the media content segments each include an address that identifies a source of the media content segment and the address is used to play the particular media content segment when required according to the personalized sequence.

In a different aspect of the innovation, the play sequence includes an address for each discrete media content segment which address allows playing of the particular discrete media content segment upon demand.

In yet a further aspect of the invention the play sequence includes address instructions for each discrete media content segment causing the play thereof in accordance with the play sequence on a source specific to the media content segment and where the play sequence includes address instructions of different sources.

According to an aspect of the invention, the method includes the step of identifying live streaming media content segments which meet predetermined selection criteria determined by a user, and modifying said play sequence to accommodate the identified live streaming media content segments.

According to a further aspect of the invention, the derived play sequence after interruption to accommodate the specific live media content resumes play of media content based on the order of play.

According to a further aspect of the invention, the derived play sequence, after an interruption which interrupted an archived media content segment, plays the entire archived media content segment or plays a remaining unplayed portion of the archived media segment or plays a portion of the archived media segment immediately proceeding the interruption followed by the remaining unplayed portion of the archived media segment.

According to yet a further aspect of the invention, the derived play sequence is stored as a program along with program timing information for the playing thereof and the method allows the storage of multiple programs.

According to a further aspect of the invention, the program timing information includes the ability to play the program on a repetitive scheduled basis.

A method of identifying audio content and the selective programming thereof to define a personalized sequence of discrete audio segments according to the present invention comprises:

identifying a series of archived audio segments of possible interest to a user, identifying a series of live audio segments available at specific times and of a known duration of possible interest to the user, forming a basic series of audio segments from at least said archived audio segments for play in a particular manner according to information entered by the user, forming an interrupting series of audio segments from at least said live audio segments including timing information for playing of each audio segment, and producing an audio signal based on said basic series of audio segments which are interrupted by said interrupting series at the specific times of the audio segments and for the duration thereof.

In a preferred aspect of the method, the basic audio segments also include live audio segments.

A system for allowing a user to manage media content available from a host of sources and produce a media signal customized according to user identified criteria, according to the present invention comprises:

a first web page interface for identifying media segments of possible interest to the particular user where the media segments include live media segments and archived media segments and selecting therefrom a group of media segments of particular interest to the user, a second web page interface allowing the user to select from the group of media segments and form a basic sequence of media segments to be played in a predetermined manner and also allowing the user to select an interrupting series of media segments to be played in a manner to interrupt the basic sequence of media segments at particular times and for the duration thereof and thereafter return to said basic sequence of media segments, and a third web page interface to allow the user to play said basic sequence of media segments and said interrupting series of media segments.

According to an aspect of the invention, the system upon return to the basic sequence resumes the media segment that was interrupted.

The system, according to an aspect of the invention includes memory means for tracking archived media segments to identify media segments which have been previously played to avoid replaying thereof.

In a further aspect of the invention, the system conducts additional searches from time to time to locate current media segments of an identified content provider and adds the current media segments to the selected archived media segments.

In a preferred aspect of the invention, the media segments are audio media segments available over a public computer network.

In a further aspect of the invention, the media segments are available and transmitted for play on a user device connected to the public Internet.

The present invention provides a method to construct a customized program to be constructed, from both live feeds, and also archived segments of audio or video content. For example:

to listen to a first live radio station available on the Internet from 7:30 am to 8:30 am, and to listen to a second live radio station from 5:30 pm to 6:30 pm, but to interrupt those with the sports report from a third live radio station, which is available at 15 and 45 minutes past each hour, for a duration of 2 minutes, and to also interrupt the first and second radio stations with the business news report from a fourth live radio station for 3 minutes, beginning at 23 minutes past the hour between 5:00 am and 9:00 am each weekday, and to also interrupt the first and second live radio stations with an archived audio segment available from a web site listing a large number of science news segments, for as long as the segment runs, beginning at 50 minutes past each hour, and to also interrupt the above audio segments with alerts, bulletins and other non-scheduled, timely content which meets criteria specified to be of interest to be received in this manner.

BRIEF DESCRIPTION OF THE DRAWINGS

Preferred embodiments of the invention are shown in the drawings, wherein:

FIG. 1 illustrates the steps of a Central Host, a User, and a Content Provider;

FIG. 2 shows in more detail, the steps to obtain additional details of audio segments from the content provider;

FIG. 3 shows the steps to build a program of segments;

FIG. 4 shows the steps to access a built program and begin playing thereof;

FIG. 5 through FIG. 7 show a user interface to gather audio segment details for inclusion in the Central Host's database;

FIG. 8 through FIG. 15 shows the user interface to create and play a customized audio program.

DETAILED DESCRIPTION OF THE PREFERRED EMBODIMENTS

Figure 1:
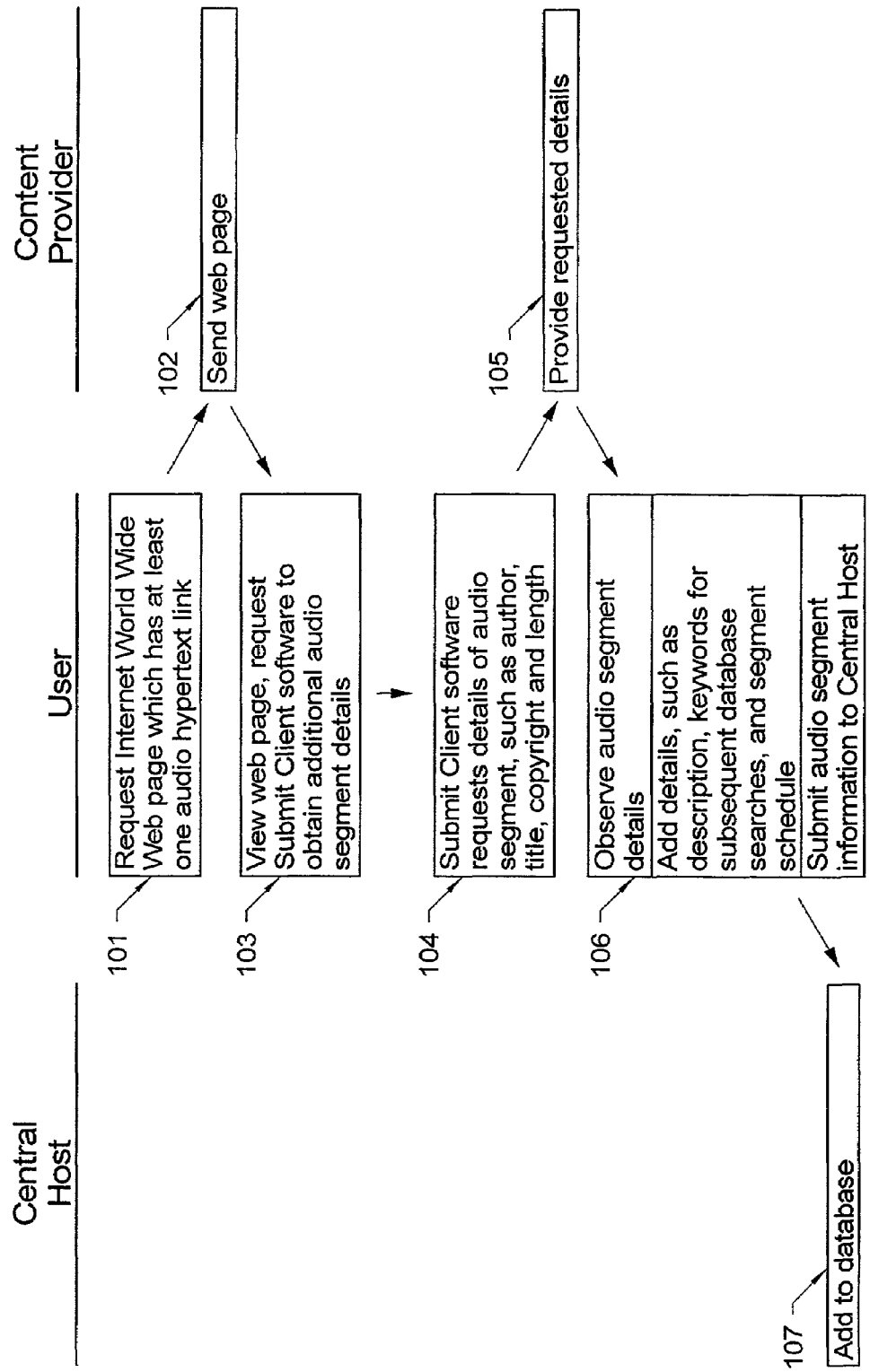
FIG. 1 through FIG. 4 are block diagrams illustrating the functionality and computer communications interaction for a possible embodiment of the present invention.

The embodiment herein describes receiving the audio at a personal computer connected to the Internet. However, it should be noted that this is for illustrative purposes only, and other embodiments of the present invention will be obvious to those skilled in the art. For example, the listening device could be an Internet appliance, which here refers to a somewhat single-purpose device, such as a device specifically designed to play Internet audio. Other listening devices could include cellular telephones, traditional land-line telephones and wireless personal digital assistants.

Also, analogous steps could be used to perform similar actions with video, rather than the audio used for the embodiment described below, and such video-based applications are simply another embodiment of said present invention. The main difference for video content, from a networking perspective, is that higher-speed network connections are required to provide high-quality motion video, and a video display is required at the listening/viewing station. Other requirements include greater processing capacity and memory storage at the listening/viewing station. Current personal computers typically have adequate processing capacity and memory storage for motion video, and current dial-up modems have adequate speed for lowquality video purposes. As higher-speed network connections become lower-cost, and more common, motion video quality will increase substantially.

Current digitized audio and video players typically have a pause in the audio or video when a new content source is selected, said pause being due to the necessity to buffer (that is, to store locally at the listening/viewing station) several seconds of content to be played during periods when digitized content is briefly interrupted due to network or server congestion or other cause. There are several methods to deal with the pause, such as the following:

play some content which is stored locally, such as music
enhance the digitized audio player to begin playing streaming content immediately when it first arrives, and to build up the buffer of content during this time as well
display a message, showing how many more seconds of buffering will occur until the playing of the content will begin
pre-fetch the first several seconds of a subsequent content segment before the previous segment completes As network connections become higher-speed and as these higher-speed connections become more commonplace, the time required for this buffering will decrease, reducing the need for the above special handling.

In the Figures, the following terms are used:
the Central Host refers to a computing facility which is accessible to many users, for example, a web site on the Internet
the User refers to a typical user of the service provided by the present invention, and could be a person at a computer with a web browser, possibly with additional software to implement some of the functions of the present invention, and a connection to the Internet
the Configuration Station could be said computer with a web browser
the Listening/Viewing Station could be the said computer, or it could be an entirely separate device, possibly located remotely from said computer
the Content Provider refers to a source of audio content, typically this would be implemented as two parts, for example;
  i) a web site which hosts a web server, which has a page with one or more hypertext link(s) to sources of audio content
  ii) the actual source(s) of the audio content, which may be the same server as the web server, or a server anywhere else on the Internet Furthermore, the terms live audio, and real-time audio, refer to audio which is available over a network, such as the Internet, at the same time to all possible recipients. Examples would include listening to a standard broadcast radio station which simultaneously provides the audio over the Internet, or a sports or business event where the audio is sent over the Internet as the event occurs. Such material may be available continuously, as in the case of radio, or may have a finite duration, as for a live sports event or a press conference.

The term archived audio refers to audio which is stored in digital form, and available to be played from the beginning, at any time, for each possible recipient. Examples include a science or business news report, which can be listened to, from the beginning, at any time each listener wishes. Such material is generally a few minutes to a few hours in length.

Typical digitized audio players, such as RealNetworks, Inc.'s RealPlayer support commands which can limit the maximum playing time of both live and archived audio. Therefore, it is possible to build a playlist which specifies that a continuously-playing radio station or archived audio only be played for 5 minutes, and then the next item in the playlist will be played.

Furthermore, with additional software, such players support the following capabilities:

playing of archived audio from a first source to be interrupted, noting how far into the archived audio the interruption occurred,
playing an interruption, such as a once-hourly business report, or an important bulletin from a second audio source, and
at the end of the interruption, resuming the interrupted archived audio from the first source at, or to improve intelligibility in case the interruption happened in mid-word or mid-sentence, resuming playing the interrupted audio some number of seconds before the interruption occurred.

Additionally, for the descriptions herein, the term segment refers to digitized audio received over a network from a single audio source. Said segment could be a continuously-playing feed from a live radio station, a timed-portion of audio from a live radio station, or all or part of archived audio stored in digital form on a server.

The term program refers to a sequence of segments, typically from a variety of sources. For example, a user might create a program which consists of playing live audio from a first radio station except when interrupted by:

a second radio station at 15 and 45 minutes past the hour, for a duration of 2 minutes each time, since said second radio station has a sports report at those times
a third radio station at 23 minutes past the hour, for a duration of 3 minutes, since said third radio station has a business report at that time
a randomly-selected archived music file from the local computer's hard disk, once per hour FIG. 1 shows the main steps to submit references to audio segments to the Central Host's database. Such submissions would be done by the administrators of the Central Host's database, and possibly also by any user who wishes to do so.

At step 101, using a standard web browser, the user enters the uniform resource locator of a hypertext markup language page at an Internet world wide web site which has hypertext hot-links to one or more audio sources of interest. This is typically done by typing the full URL into the web browser, by clicking on a referring page on another web page, or by selecting a previously-bookmarked entry.

At step 102, the web server sends back to the user the HTML web page requested, and at step 103, this page is displayed to the user, and said user reads said web page to identify from the descriptive text therein a hypertext hot-link to audio which is of interest. These steps use standard web browsers and servers, as is currently widely implemented on the world wide web of the Internet. However, to obtain additional details of the audio, the user requires additional software, which will here be called the Submit Client. The Submit Client software will be further detailed in FIG. 2. However, in summary, in step 104, the Submit Client software sends a request to the audio source for additional details of the audio segment of interest, and in step 105 the audio source replies with the details, which are then displayed and available for said user to observe in step 106.

Said user will then have displayed the received details, along with fields to add information to said received details from the content provider. Examples of such user-added information include: a detailed description of the information provided by the audio segment, a rating as to the quality of the information, a rating as to the audience suitable for the audio, keywords to be used for subsequent searching for the audio segment, how often the audio segment is updated, whether the submitted audio segment information is new or an update to previously-submitted audio segment information, the URL of a web page for additional information concerning the audio, and so on.

A key feature of this ability to add audio segment information is the additional capability to enter detailed schedule information for a portion of a live feed, if desired. For example, the start time, repeat interval, duration, and hours and days of availability, along with a more detailed description of said portion could be entered. An example of such a portion would be a live audio source's sports report which is available at 15 and 45 minutes past each hour, for a duration of 2 minutes, every day of the week.

Another feature would be for the Submit Client software to automatically search for all audio links on a single web page, or tree of web pages. This is useful as many sites have web pages with long listings of archived audio, such as the last five years of science news stories. Some sites which regularly update their archived audio segments, such as for a weekly talk show, give the new archived audio segment a new URL, often choosing a new filename based on the date, such as 20000424.rm, for their Apr. 24, 2000 show, as the filename is in yyyymmdd format. Methods to automate the process of locating such additional and new audio content would be obvious to those skilled in the art of programming, and with web programming in particular.

Continuing with step 106, said user can submit this information to the Central Host, and in step 107, the Central Host stores this information into its database.

It is intended that the Central Host's database will have references to both:
  Live audio, such as from radio stations which simultaneously send their audio over the Internet.
  Separate references to specific features which are broadcast at specific times by said radio stations. For example, a typical news radio station will have a fixed daily schedule, where at specific and repeatable times of each day they will broadcast the news, weather and traffic, and also reports on sports, technology, the stock market, travel, entertainment, and other topics.

With a large community of users submitting audio segment references, duplications, errors, and references which are no longer correct (for example, because the audio source changed their schedule) will occur. The Central Host could maintain two databases:
  one would have whatever users submit, and
  the other would have references which have been checked for accuracy, with duplications eliminated, greater consistency in the keywords, ratings and descriptions associated with each reference.

Figure 2:
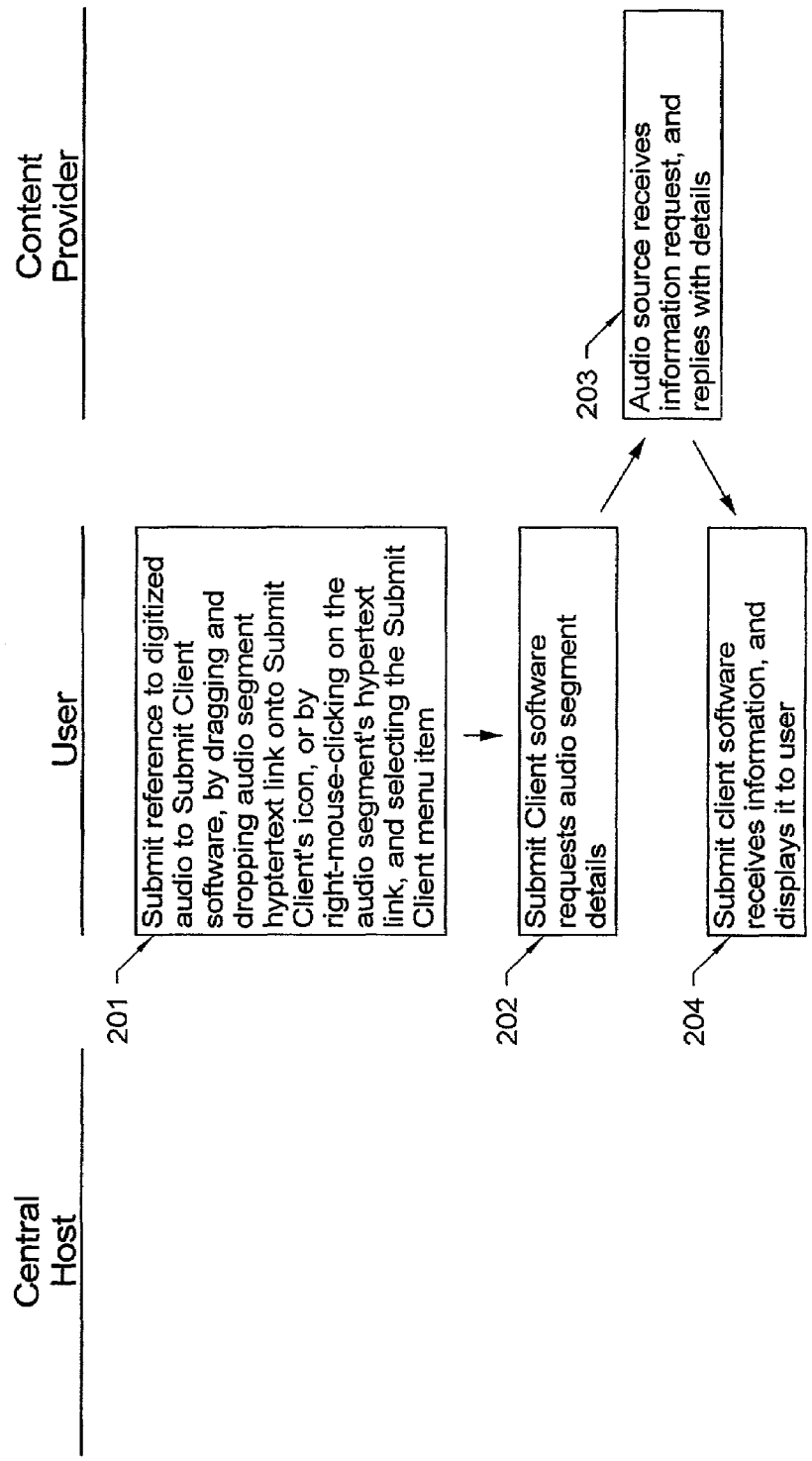

FIG. 2 provides more detail on the Submit Client software, particularly, how additional audio segment details are requested from the audio source. This description applies to RealNetworks, Inc.'s embedded RealPlayer, however, other players have similar functionality.

In step 201, the URL for the audio segment of interest is provided to the Submit Client software, which could be implemented using JavaScript. A typical such URL would be as follows:
  http://www.radio.cbc.ca/news/hourly/latest.ram
This URL would be the anchor for some hypertext, which might display "Click here for the latest hourly news report" on a page on the content provider's web site. The contents of said latest.ram file could be as follows:
  pnm://home.cbc.ca/radio/news/latestnews/latestnews.ra This is a reference to the actual digitized audio file which would be streamed over the Internet, from the content provider, in this example, using the RealNetworks, Inc.'s proprietary protocol PNM, to the RealPlayer on the listener's computer. As shown below for FIG. 3, special RealPlayer commands, such as end="0:5:00", which only plays that segment for a maximum of five minutes before moving on to the next item in the playlist, must be appended to entries in the RAM file. RAM files are created by the organization making the content available, and there are many ways of building them. For example, some RAM files have many entries, such as; a reference to a copyright statement, followed by a reference to a welcome message, and then finally the reference to the actual content of interest. Some content providers divide the audio material into many separate files, for example; an hour-long talk show might be divided into four 15-minute portions. This is why it is necessary for the Submit Client to not simply use the reference to the RAM file as found on the content provider's web page as the reference to the audio segment, but rather to perform the extra step of getting the contents of the RAM, and then using the RAM file contents as the reference to the audio segment.

In step 202, the Submit Client software uses the embedded RealPlayer SetSource( ) JavaScript method to specify the audio source, and then the GetLength( ) method to determine the length of the audio segment. Many other methods are also available, such as GetLiveState( ) which returns whether the audio segment is live or archived, and GetTitle( ) which returns the title of the audio segment. The details of the use of these methods would be obvious to those skilled in the art of JavaScript programming, and knowledgeable of the RealPlayer software development tools.

In step 203, the RealServer which is the source of the audio segment would receive the requests from these methods, and reply with the information. In step 204 the information is made available to the JavaScript, and the Submit Client software can display it to the user.

Figure 3:
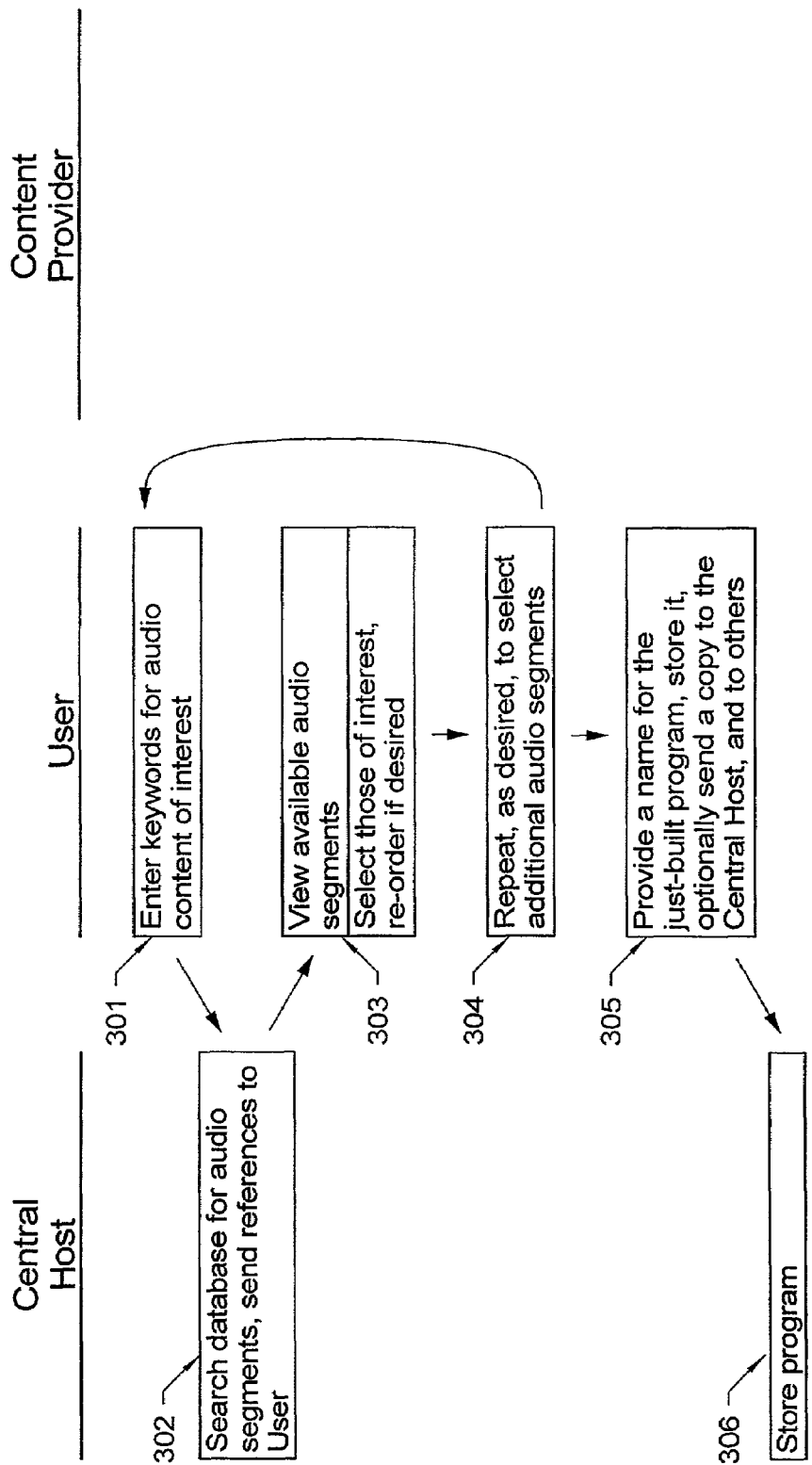

FIG. 3 provides details on how a user builds a program of audio segments of interest. In step 301, the user might go to the Central Host's web site, and enter the keywords "Toronto" and "sports". In step 302, the Central Host would then search its database for matching audio segments, according to the keywords entered in step 106, and send to the user descriptions of these, along with additional details, such as their segment lengths. In step 303, the user would view the available segments, and select those of interest which are to be included in the program being built. Other options could be made available, such as:
  viewing additional details of the audio segment, such as duration, repeat interval, update schedule, and author
  re-ordering the sequence in which the segments would be heard within the program
  specifying the times of day and the days of the week that the segment is of interest
  specifying a time offset to accommodate network delays and time zone differences
  marking individual segments which should be recorded by the user's listening device, so they can be listened to at any time
  listening to the audio source immediately
  viewing the web page associated with the audio segment In step 304, the user could repeat the keyword-search to find additional audio segments of interest. When all audio segments have been selected, in step 305 the user provides a name for the just-built program, and it is stored for immediate or future listening. The format of this stored program depends on the audio player used, but as an example, RealNetworks, Inc.'s RealPlayer supports a format they refer to as a RealAudio media, or RAM file, an example of which follows:

```
# Customized RealAudio RAM file
rtsp://209.226.148.226:665/encoder/chumam?end="0:5:00"
pnm://media5.bloomberg.com/wbbr/topbus/20278596_288.rm
pnm://raserver.das-x.dec.com/rcfoc/20000424.rm?end="0:0:30"
```

The file with the above contents is given a name with a .ram extension, such as myprogram.ram, and when a web browser or operating system is requested to open such a program, it will recognize, from the filename extension, that the file is to be interpreted by a RealPlayer, and submit the filename to the RealPlayer for processing.

The RealPlayer will interpret the above file as follows.

Firstly, due to the "#", the first line is a considered a comment, and is ignored by the RealPlayer. The rest of this RAM file indicates that there are three audio segments in the playlist. The first is a live feed, using the RTSP protocol, from the RealServer at IP address 209.226.148.226, using port 665, and this audio segment will only play for 5 minutes, due to the keyword end and the numerical parameter after it. The next line indicates that the RealNetworks proprietary protocol PNM is to be used to receive the entire archived audio file 20278596_288.rm from the subdirectory /wwbbr/topbus from the server at media4.bloomberg.com. Finally, the last line indicates that again using the PNM protocol, the digitized audio file 20000424.rm is to be retrieved from the /rcfoc subdirectory of the RealAudio server at raserver.das-x.dec.com, but only 30 seconds of that archived audio is to be played. Additional capabilities of such RAM files will be obvious to those skilled in the art of digitized audio players, such as RealPlayer. Again it should be noted that this example is for audio, but the present invention applies to other media as well, such as video. Also, again, it should be noted that there are other digitized video and audio players and file formats, such as those for Microsoft Corporation's Windows Media Player. While the Windows Media Player has many differences, such as the specific methods used for invoking and controlling it, the audio encoding method, the program file format, and the commands used to control the player, the Windows Media Player has the same basic capabilities, and the present invention could equally well be implemented using Windows Media Player, or a combination of such players. A combination of such players can be required since the players each generally only support a few streaming media encoding formats, so to receive many encoding formats, requiring more than one player is common.

Continuing with step 306, optionally, the user can request that a copy of the program be sent to others, for example, by electronic mail. Also optionally, the user can request that a copy of the program be sent to the Central Host, which stores it in step 306, as this allows retrieving the program from other locations and devices, so the same program can be heard elsewhere.

Figure 4:
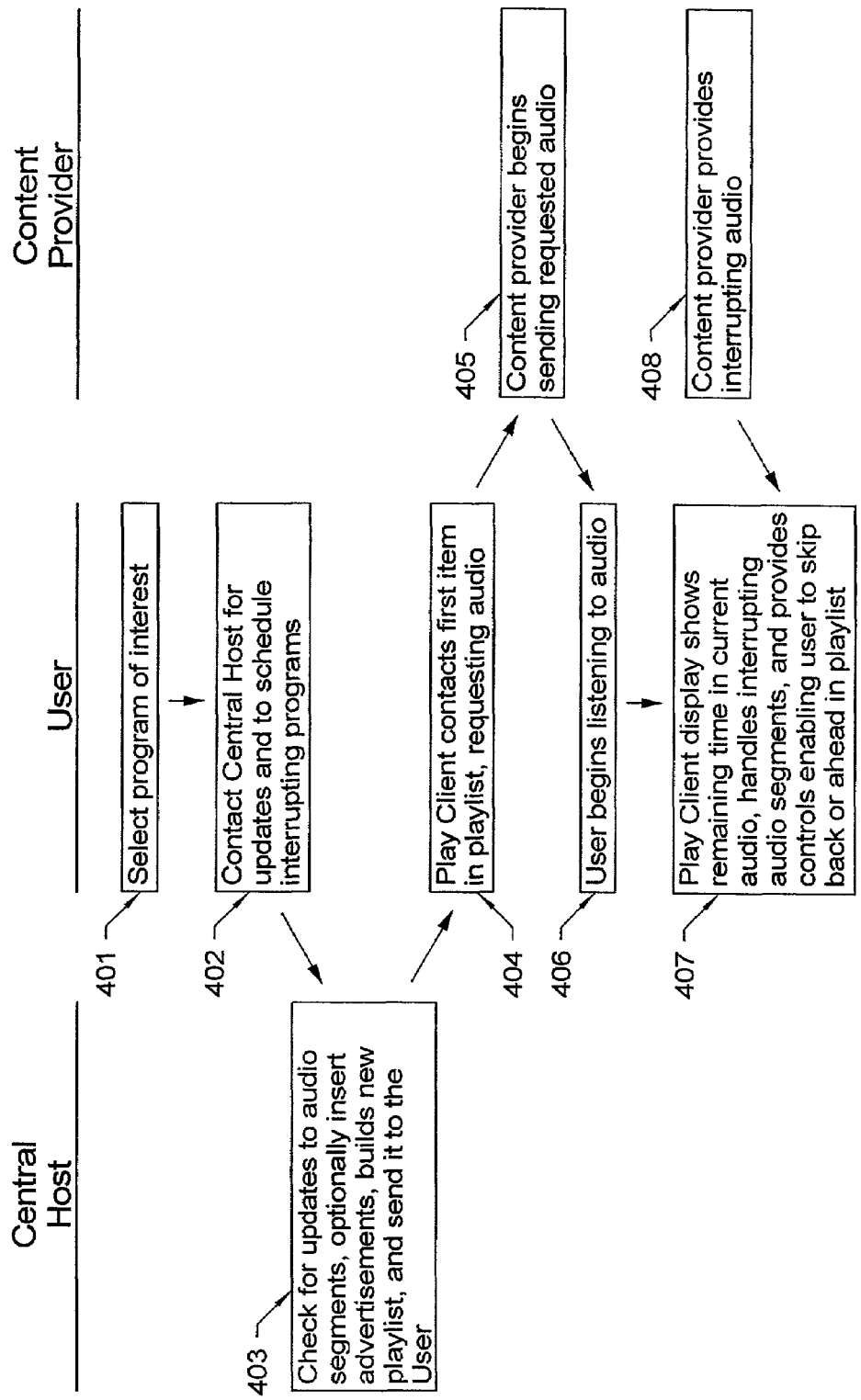

FIG. 4 provides details of listening to an audio program which has already been created and stored, as in FIG. 3.

For the first step, the user selects the program of interest. This program could be stored locally, as shown in step 401, or could be stored on the Central Host. In step 402, the user contacts the Central Host and submits the program to it. In step 403, the Central Host checks for updates for the audio segments in the received program, for example:

Whether a selected audio segment now has a new schedule (for example, the sports report is still at the same URL, but is now available at 10 and 40 minutes past the hour, rather than 15 and 45 minutes past the hour).

The next name for an archived audio segment of interest, for example, if the Central Host has a record that the user has already heard the weekly technology report archived at pnm://raserver.das-x.dec.com/rcfoc/20000424.rm, then the Central Host could update the program file to reference the content provider's next weekly technology report, which might have a URL of pnm://raserver.das-x.dec.com/rcfoc/20000501.rm.

Whether an audio segment should be played at all, for example, if a user has heard the hourly news report at http://www.radio.cbc.ca/news/hourly/latest.ram (which references the actual digitized audio file of pnm://home.cbc.ca/radio/news/latestnews/latestnews.ra—which always has the same filename, but the contents are updated hourly), then the Central Host will not include this segment in the playlist at all.

Also in step 403, the host may insert into the program references to advertisements (which could be audio, video, graphics or text), and said advertisements could be customized according to the types of audio segments selected by the user, demographic information solicited from the user as part of allowing them access to the Central Host, or some other criteria.

While the RAM file supported by RealPlayer allows specifying a maximum playing time for audio played, it does not support more advanced features, such as interrupting a first live audio feed with a second live audio feed, and then resuming playing said first live audio feed when said interruption completes. However, such capabilities can be accomplished using more advanced programming, such as JavaScript and the embedded version of RealPlayer. The playlist information sent from the Central Host in step 303 can therefore include additional details, such as the start time, duration, and repeat interval for interrupting audio. This information is then used in step 404 to augment the standard play functions of the RealAudio player. For example, the RealPlayer GetPosition( ) method returns the position in the currently playing audio segment which is to be interrupted, so the current play position can be stored temporarily. Then the SetSource( ) method can be used to begin playing the interrupting audio segment, by specifying the reference to the interrupting audio segment as a parameter to the method. Once the interrupting audio segment completes, the SetSource( ) and SetPosition( ) methods allow restarting the interrupted audio segment where it was interrupted. Furthermore, subtracting from the returned GetPosition( ) value allows restarting somewhat earlier in the interrupted audio segment, in case the interrupted audio was in mid-word or mid-sentence.

Other features can also be implemented, for example, adding to the value returned by the GetPosition( ) method allows skipping ahead in the current audio segment, and the DoPrevItem( ) and DoNextItem( ) methods allow skipping to the previous or next entry in the playlist. Other methods allow displaying the current play status, such as whether the player is buffering digitized audio in preparation for playing it. Other control functions can be accomplished with other combinations of these and other methods which are available for the RealPlayer, and will be obvious to those knowledgeable in RealPlayer programming. Again, the above examples of RealPlayer programming are simply used to detail the procedures required to implement the functionality, and other implementations, both for video, and for other audio players, such as Microsoft Corporation's Windows Media Player are simply other embodiments of the present invention.

Continuing with step 404, either automatically, or using controls displayed by a standard web browser, the user's computer will then request audio from a content provider, which will, in step 405, begin streaming this digitized audio back to the user.

Note that the content provider could in fact be the same computer as is be used by the user to play the audio—this would be common for the case of music files, such as those in MP3 format, which are stored on the user's computer's hard disk drive.

In step 406, the user will begin hearing the received audio, and as described above, through interruptions timed through a schedule, through reaching the end of archived audio segments, and through interaction with the user and the above JavaScript methods, the RealPlayer will typically halt and resume playing audio, and request other audio segments from other content providers, as scheduled in the program. As shown in step 407, during this time, the JavaScript software can show the constantly-updated player status, such as the description of the following:

the previous audio segment played, and its duration,
the current audio segment playing, along with the time remaining before the next audio segment will be played,
the next audio segment to be played, and its duration, and
whether the current audio playing is an interruption.

One of the types of audio segments which can be included in an audio program is unscheduled interrupting audio, such as a press conference or financial news bulletin. Such audio could be provided by content providers, and would interrupt the currently-playing audio segment whenever said unscheduled interrupting audio meeting specified criteria, such as topic or level of urgency, became available. As described above, while a standard audio player such as RealNetworks, Inc.'s RealPlayer does not directly have the capability of handling such interrupting audio, utilizing JavaScript, Java and RealNetwork's embedded RealPlayer can provide this functionality by utilizing events and optionally a separate control communications channel to either the Central Host or the interrupting audio segment's server.

At step 408, a content provider has unscheduled interrupting audio, and sends this to the user's audio player, to interrupt any currently-playing audio segment.

Also, if the current audio segment has been interrupted, the description and the time remaining before resuming the interrupted audio can be displayed, as will be shown in, and described for FIG. 15.

A further function of the JavaScript or other software controlling the playing of the audio is recording specific audio segments, such as those specified in step 303 of FIG. 3, when the program was built. By playing this recorded audio back, the user could therefore hear a missed real-time audio segment, such as the most recent news or weather.

FIGS. 5 through 7 show the user interface for submitting new audio segments to the Central Host's database, as described in step 201 of FIG. 2. As shown in step 103 of FIG. 1, typically, a user would already be viewing a web page which has a hot-link with displayed text such as "Click here to listen". By right-mouse-clicking on that hot-link, and, for Netscape Communications Corporation's Netscape Navigator world wide web browser client, selecting the "Copy Link Location" pop-up menu item, the HTML anchor text of that hot-link will be copied to the operating system's clipboard buffer. By moving the cursor to text window 501 in FIG. 5, the anchor text can be pasted to that text window, as is shown at 502. Then, by clicking on the "Get Details" button 503, the Submit Client software will request the details of that audio segment, as described in step 202 of FIG. 2.

FIG. 6 shows the user interface used to display the audio segment details which would subsequently be received, as described in step 204 of FIG. 2. The Audio URL window 601 shows the HTML anchor text 502 from FIG. 5. The Page URL window 602 shows the URL of the web page which displayed the hot-link. Depending on the exact method of implementation, this may be automatically determined by the Submit Client software, or may need to be manually cut-and-pasted by the user. The Audio URL File Contents window 603 shows the contents of the Audio URL file specified in text window 601. This file is normally retrieved by the audio player software, but in this case, would be retrieved by the Submit Client software, and displayed to the user. In this example, there is only one line in the file, but multiple-line files are common, and could be displayed in a scrolling window or by other method, such methods being well-known to those familiar with HTML programming. The contents of window 603 may need to be examined, for example, to determine the file-naming scheme used for periodically-updated content. Or the contents of window 603 may need to be edited, for example to remove information not needed for playing the audio, such as commands present for compatibility with older audio players. Text windows 604, 605 and 606 display the audio segment's Title, Author and Copyright fields, as reported by the audio segment's server, as shown in step 203 of FIG. 2. Text window 607 displays the length of the audio segment (in hours:minutes:seconds format), or if the segment is live audio, then text such as "Live" will instead be displayed in window 607, such distinction also being reported by the audio segment's server. A more descriptive title for the audio segment can be entered into text window 608, and keywords to be used for later searching for such audio segments on the Central Host's database can be entered into text window 609. Such keywords could be more structured, such as having specific fields for the geographic location or relevance of the audio source, type of content, a rating for suitability of audience, and so on.

If the user wishes to now submit the displayed reference information to the audio segment to the Central Host's database, then button 616 can now be clicked.

As described for step 106 in FIG. 1, if the user would like to define a portion of this audio segment as having a particular type of information, then the details for said portion can be entered in the remainder of the text windows 610 through 615. Example such entries are shown in FIG. 7.

For example, if the Audio URL in text window 701 is the digitized audio from a live, continuously-playing radio station which provides a news report every hour, on the hour, for a duration of four minutes, the audio segment specified in FIG. 6 could be augmented to provide only this news report, rather than the continuously-playing radio station audio. Said augmentation would be performed as follows:

The Start Time text window 710 specifies when the audio is first available. For convenience to the user, the word "Midnight" could be entered in addition to 12:00:00 AM, to indicate that the news report begins on the hour.

The Duration window 711 specifies the duration of the news report, in this case, four minutes.

The Repeat Interval window 712 specifies how often this news report is available. In this case 1:00:00 indicates every hour.

The Days Available window 713 indicates on which days of the week the news report is available. In this case, "All" indicates every day of the week.

The Time Zone window 714 indicates in which time zone the audio source is located, so that said Start Time and Days Available fields can be correctly interpreted for listeners in other time zones.

The Delay window 715 indicates the time delay resulting from the audio digitizing process used by the audio source, as well as typical network buffering, queueing, and propagation delays. This permits listeners to accommodate these delays, so that their audio player will not start (and finish) playing the audio source's audio too soon. For example, if a listener is in the same time zone as the audio source, and creates a program to hear a 5:00 PM news broadcast, and the listener's player begins playing the audio from said audio source at 5:00 PM, the desired audio (the news broadcast) will typically not begin until about 30 seconds later, due to the various delays, so the user would hear said audio source 30 seconds too early (that is, beginning with audio which was generated at 30 seconds before 5:00 PM). By specifying said expected delay in text window 715 as 30 seconds, for example, said user's audio player will not begin playing the audio until 30 seconds after 5:00 PM, therefore beginning with the news broadcast which actually started at 5:00 PM. Depending on where and how listeners receive this digitized audio, they may each require the ability to modify this delay for their own listening situation, possibly for each segment in their program. Therefore, when users select audio segments, as in step 303 of FIG. 3, a field could be provided to specify this segment delay, which could even be a negative number if the audio source delay field 715 common to all listeners was set too great for a specific user's requirements or preferences.

The user can now click on Submit button 716 to submit this audio reference to the Central Host's database. This process of adding both basic audio references (specified in fields 701 through 709), as well as references to portions of those basic audio references (specified in fields 710 through 715) would be done by the personnel responsible for building the Central Host's database, and optionally by any user of that Central Host database as well.

Now that the procedure for adding references to audio segments to the Central Host database has been described, the next step is to describe the user interface to build an audio program from sequences of said audio segments.

Figure 8:
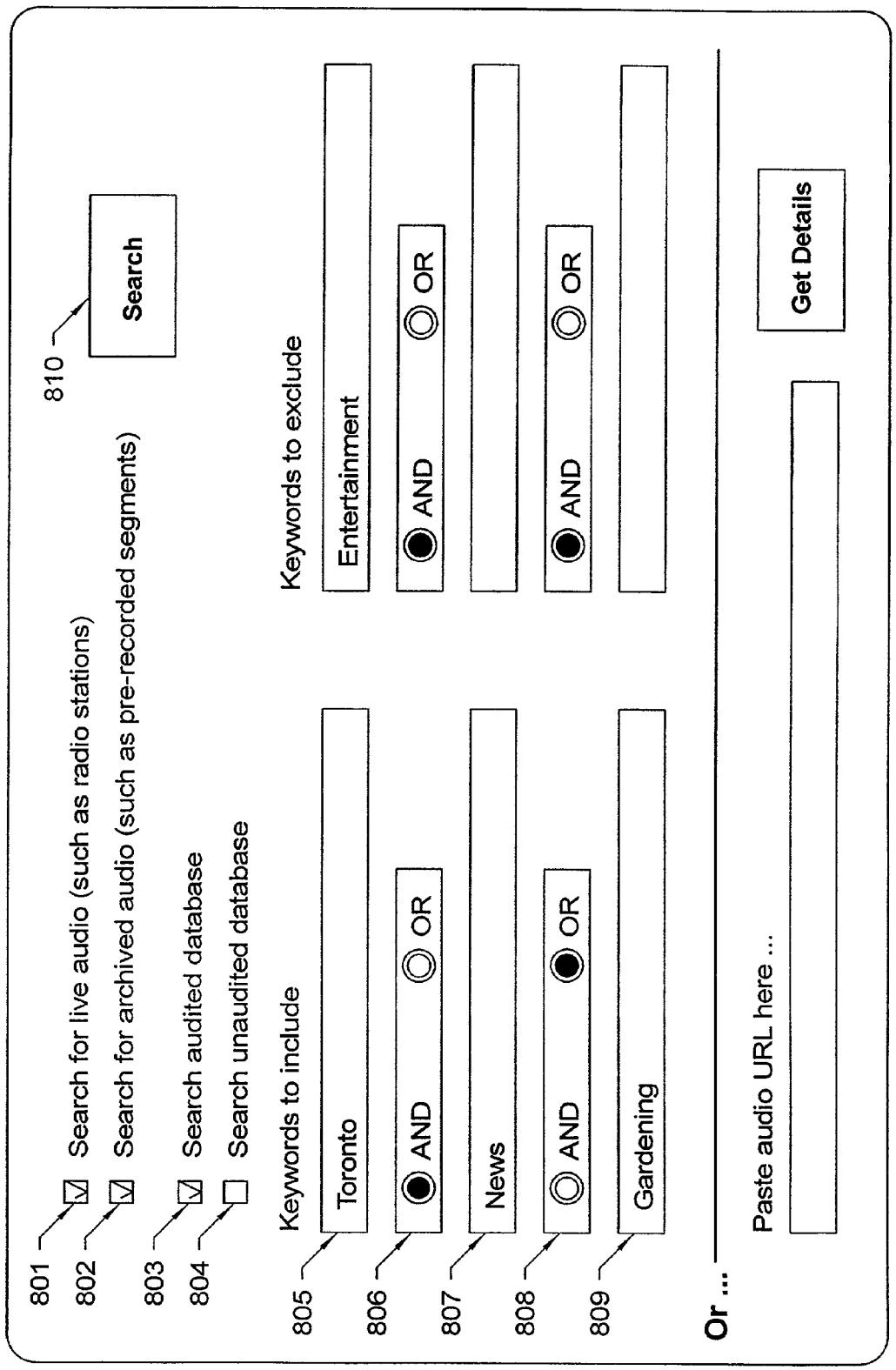

FIG. 8 shows the user interface for searching the Central Host database (the lower section of this screen will be described for FIG. 12 below). The search screen checkboxes 801 and 802 allow specifying whether only live audio, only archived audio segments, or both, are desired to be searched.

Since users may be permitted to directly submit (rather than simply e-mail requests, as is implemented by some prior art) audio segment references to the Central Host's database, for example, using the process shown in FIGS. 5, 6 and 7, there may be a desire to segment the Central Hosts's database into two sections, as follows:

An audited section which contains audio segment references which have been verified to be correct, with duplicate references removed, with consistent use of keywords, and so on.

An unaudited section, which contains whatever users submit. While this section would not have the advantages of the audited database, it could have a wider range of audio segment references, and could be more frequently updated. Examples of this content would include references to audio sources which are in other languages, or are for audio announced with little lead time, such as live press conferences or product announcements.

Therefore, check boxes 803 and 804 allow specifying which of said database sections to search.

Text windows 805 through 809 allow specifying boolean search criteria for keywords to be included in the audio segment references to be returned. And the text windows to the right of those windows 805 through 809 allow specifying keywords which are not to be in the audio segment references returned. Once the search criteria are specified, button 810 will be clicked to begin the search, which could return results such as those shown in FIG. 9.

Many other search criteria and methods could be used, and will be obvious to those skilled in the art of database design and search techniques and user interfaces therefor.

FIG. 9 shows twelve audio segment references returned (one per row), along with basic information for each reference. From left to right, the columns are the following:

A check-box for the user to indicate whether this segment should be included in the program being built by said user.

A hot-link for the user to click which will cause the audio segment to be played immediately.

The audio segment title, note that in addition, the title can be clicked to display the web page associated with said audio segment.

The duration of the audio segment, for archived audio segments. For live audio (which plays continuously and therefore has no length), the duration is shown as "Live".

The start time for the segment, this will be in hours:minutes:seconds format for live audio segments, where a portion has been defined as having particular content—for example a sports report which a radio station provides at 15 minutes and 45 minutes past each hour. For archived audio and for continuously-playing live audio, which both can be started at any time, the words "In Sequence" will be displayed as the start time, as this indicates that said audio will be played when the previous audio segment completes, or the user clicks on the "Skip to Next" button shown in FIG. 15. For unscheduled, interrupting audio, this is set to "As Available" to indicate that interruptions will be accepted at any time.

The repeat interval, which is set for audio segments which are to be heard periodically throughout the day, such as a live audio sports report which is available every half-hour, or for archived audio where a different audio segment is to be played every two hours. For continuously-playing audio, or for audio segments which are to be heard only once, the repeat interval is displayed as "None".

The listening time is normally set to All. However, for archived audio it can be set to a value less than the segment duration so that less than all of said archived audio segment will be played. And for live audio, the listening time can be set to limit the playing time, for example, to four minutes as that could be the duration of a radio station's news report.

Said twelve audio segments available to be selected are described below:

The first audio segment is a radio station which plays live audio continuously.

The next six audio segments are selected portions of the above radio station's audio. For example, the second line is a sports report which is available at 15 and 45 minutes past each hour, and has a duration of three minutes.

The eighth audio segment is an indicator that the user would like to receive interruptions of Toronto Stock Market Alerts. As with any other audio source available on the Internet, these would be offered by an organization with information which the user wishes to hear. Further customization of the type of information provided, the level of urgency required for an interruption and other details could be provided through additional screens, not shown.

The ninth audio segment is another radio station's news report, and this is available at the top of, and half-past each hour, and has a duration of four minutes and 30 seconds The tenth audio segment is yet another radio station's news report, this one is available at the top of each hour, and also has a duration of four minutes.

The last two audio segments are archived audio with lengths of 55 minutes and two seconds, and of four minutes and thirty-nine seconds, respectively.

The user now has the option to do the following:

Immediately listen to, or view the web page for, any of the displayed audio segments.

Change the start time, repeat interval or listening time, for any of the displayed audio segments.

To select audio segments to be included in the customized program being built, the user would then click the box in the Select column corresponding to the desired audio segments, and then click on the "Include Selected Segments In Program" button at the bottom of the screen shown in FIG. 9. These steps are described in detail below.

FIG. 10 shows a possible screen after a user has selected said desired audio segments. Changes made by the user are as follows:

the third, sixth, eighth and eleventh audio segments have been selected for inclusion in the audio program being built, the listening time of the third audio segment has been reduced from two minutes to one and a half minutes, perhaps because the user knows the last 30 seconds of the report are international news for which another information source is preferred, and a start time of 3:20 PM has been set for the gardening show, and a repeat interval of one day has been set, so a new program will be heard each day, beginning at that time (note that since a start time has been set, rather than only hearing this gardening show when previous audio completes, said gardening show will interrupt other audio such as a continuously-playing radio station).

Once the user has completed setting the above preferences, the user will click the "Include Selected Segments In Program" button at the bottom of the screen, and a screen such as that shown in FIG. 11 would then be presented to the user. FIG. 11 shows that only those audio segments selected in FIG. 10 have been included in the audio program being built. The user now has the choice of saving the audio program or of first adding more audio segments. If the user clicks on the "Select More Audio Segments" button near the bottom of FIG. 11, then a search screen such as that shown in FIG. 12 will be presented.

Figure 12:
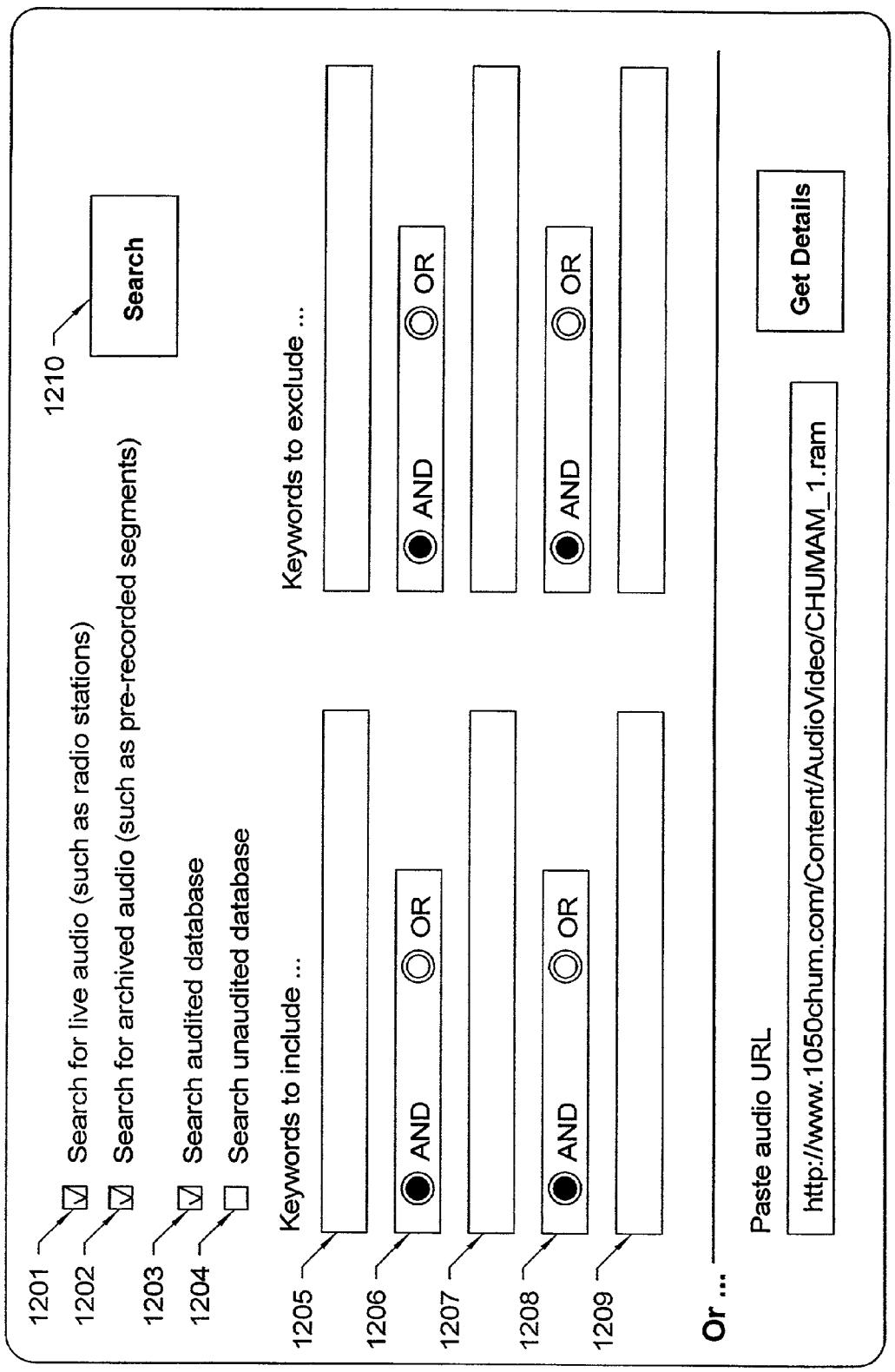

Note this is the same search screen as was shown in FIG. 8, however, this time the user wishes to enter audio segment references which are not in the Central Host's database, so using the same cut-and-paste process as was used for text window 501 in FIG. 5, the user enters the hot-link and clicks the Get Details button, as shown at the bottom of FIG. 12. A process of viewing and possibly changing or adding to the displayed information, as was shown for FIG. 6 could now be used, however, in this case, the audio segment reference will not be submitted to the Central Host's database for others to use or update, rather, it will only be available for this user. This process can be repeated as desired, and as shown in FIG. 13, additional audio segment references would be added to those shown earlier for FIG. 11.

FIG. 13 also shows that for audio segments which will be played in sequence (that is, they do not have a start time specified), a number can be entered to set the order in which they will be played (note there are other user interfaces for specifying a sequence, such as clicking on arrows to move segments up or down in the sequence). Also, a check-box is available to specify that when the entire audio program has been played, it should be started again from the beginning of the sequence. Note that a time-line or Gantt chart could now be displayed to show graphically what audio will be played throughout a time period.

The next step is to save the audio program, by clicking on the Save Program button at the bottom of FIG. 13. This could produce a screen such as that shown in FIG. 14.

FIG. 14 shows that the software allows up to four programs to be saved, and that three have already been saved, as programs A, B, and C. Note that each already-saved program has previously been given a name, to aid in recalling what the contents are, or when it will be played. For example, program A has been given the name "My morning radio", has three audio segments, and will be the program played between the hours of 4:00 AM and noon each weekday. Note that by clicking on any program name, that program can be played regardless of the listen window times set. The program created as described above could now be saved as program A, B, C, or D, by the following steps:

specifying a program name, in the row corresponding to the row to be used specifying a listen window of time, and the days of the week when this program is to be played, in the three Listen Window text boxes of the row to be used clicking on the A, B, C or D button of the row to be used If the program name for row D was set to "Dinnertime Radio", and the D button clicked to store the program, and Dinnertime Radio was then clicked to begin listening to the program, then a display such as that shown in FIG. 15 might be the result.

Alternatively, if the Listen Now button is clicked, then the saved audio program for the current time of day, and day of week (or closest to it) will be automatically selected and played.

FIG. 15 shows a display which could be presented to a user listening to an audio program. It shows the following:

that the audio program is comprised of eight audio segments (one per row)

that the user had been listening to 1050 Chum Oldies Radio (which is a continuously-playing live radio station), but that this was interrupted by the 680 News Business Report, which has a periodic specific start time set (and this audio segment will resume once the interruption has completed)

that there is 1 minute and 32 seconds of the two-minute 680 News Business Report remaining to be heard Note that the audio player controls at the lower right of the screen permit the following functions:
skipping back to the previously-heard audio segment
skipping ahead within the current audio segment
skipping ahead to the next audio segment
stopping, pausing and starting the audio Other audio player controls could be provided, for example, to; keep listening to an audio program past its scheduled duration, replay a portion of archived audio, specify how long to skip ahead within an audio segment, or immediately or at a specified time, record the audio for future listening.

Other screens to view and edit the audio segments in saved programs, to specify that certain audio programs or segments are to be recorded for listening at a later time, to e-mail a program to another person, and to do other administrative tasks or provide other features based on the disclosed functions will be obvious to those skilled in the art, and are equally considered part of the present invention.

Figure 16:
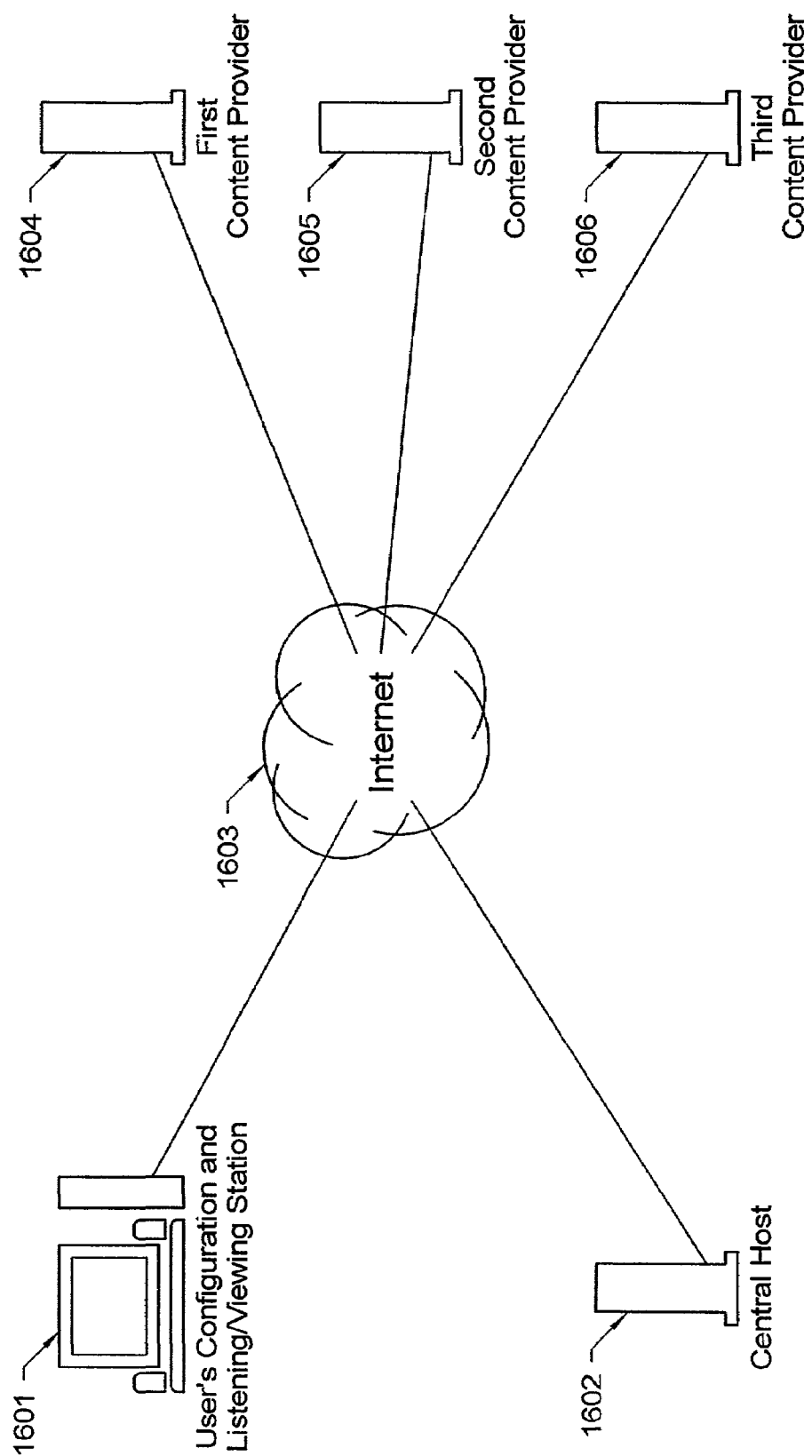
FIG. 16 and FIG. 17 show network configurations of the present invention.

FIG. 16 shows the network configuration for a possible embodiment of the present invention. Configuration and Listening/Viewing Station 1601 would be used by a user to perform the functions depicted in FIGS. 5 through 15.

The following steps could be utilized to submit audio segment references to Central Host 1602's database.

Utilizing a network, such as the Internet 1603, and a standard world wide web browser client, the Configuration and Listening/Viewing Station 1601 could be used to contact First Content Source 1604 to view a web page describing the available audio content. By some means, such as right-mouse-clicking on an audio hot-link and the browser's "Copy Link Location" function, the reference to the audio could be copied to a clipboard buffer. Central Host 1602 could then be contacted to view a web page for submitting audio references to said Central Host 1602's database. The clipboard buffer, now holding the audio reference could then be copied to a text window such as text window 501 in FIG. 5. Clicking on a button, such as button 503 in FIG. 5 could result in the First Content Source 1604 being contacted, as in step 202 of FIG. 2, to request additional audio segment reference details, such as those shown at 602 through 607 of FIG. 6. The user could then provide additional information, such as that shown at 708 through 715 in FIG. 7, and button 716 of FIG. 7 could be clicked to submit said additional information to Central Host 1602's database.

The following steps could be utilized to create an audio program.

Utilizing a network, such as the Internet 1603, and a standard world wide web browser client, the Configuration and Listening/Viewing Station 1601 could be used to contact Central Host 1602 to display a keyword search page, such as is shown in FIG. 8. Keywords describing the desired content would be entered and submitted to said Central Host 1602's database search engine, and the corresponding available audio references would be sent to Configuration and Listening/Viewing Station 1601, and displayed thereon, such as is shown in FIG. 9. Changes and Selections would be made, such as are shown in FIG. 10, and the resulting program would be submitted to Central Host 1602's database to be stored, such as is shown in FIG. 14. Alternatively, said program could be saved locally on Configuration and Listening/Viewing Station 1601.

The following steps could be utilized to listen to an audio program.

A user at Configuration and Listening/Viewing Station 1601 would view the programs already saved, such as is shown in FIG. 14. By clicking on the "Listen Now" button, Configuration and Listening/Viewing Station 1601 would contact Central Host 1602 to request updates to the saved program to be played according to the current time and day. Central Host 1602 would then perform the following functions, as in step 403 of FIG. 4:

Check whether any database updates, such as changed start times, repeat intervals, or segment durations, are available for the audio segment references comprising the program.

Check whether archived audio segments in the program have already been played, and if so, whether there are related archived audio segments which can be played instead. For example, if a web site has the last several years of weekly garden shows archived, then a different garden show could be played each day (until all have been heard). Or if a sports team has all their games available by radio, but the particular radio station is different each week, then the audio from whichever radio station that is scheduled to play the next game could be played.

Using demographic information solicited as part of registering to use this service, appropriate advertisements could be included in the program, for example:
i) at fixed intervals,
ii) between each audio segment, or
iii) in place of advertisements provided by the content providers, for example, by receiving advertisement timing information from the content providers in return for sharing the advertising revenue.

Said advertisements could be archived on Central Host 1602, or other servers, such as those run by the advertisers's advertising agencies.

Central Host 1602 would then send the updated program information to Configuration and Listening/Viewing Station 1601, and said Configuration and Listening/Viewing Station 1601 would then directly contact the Content Sources and request the content be sent directly to Configuration and Listening/Viewing Station 1601.

Figure 17:
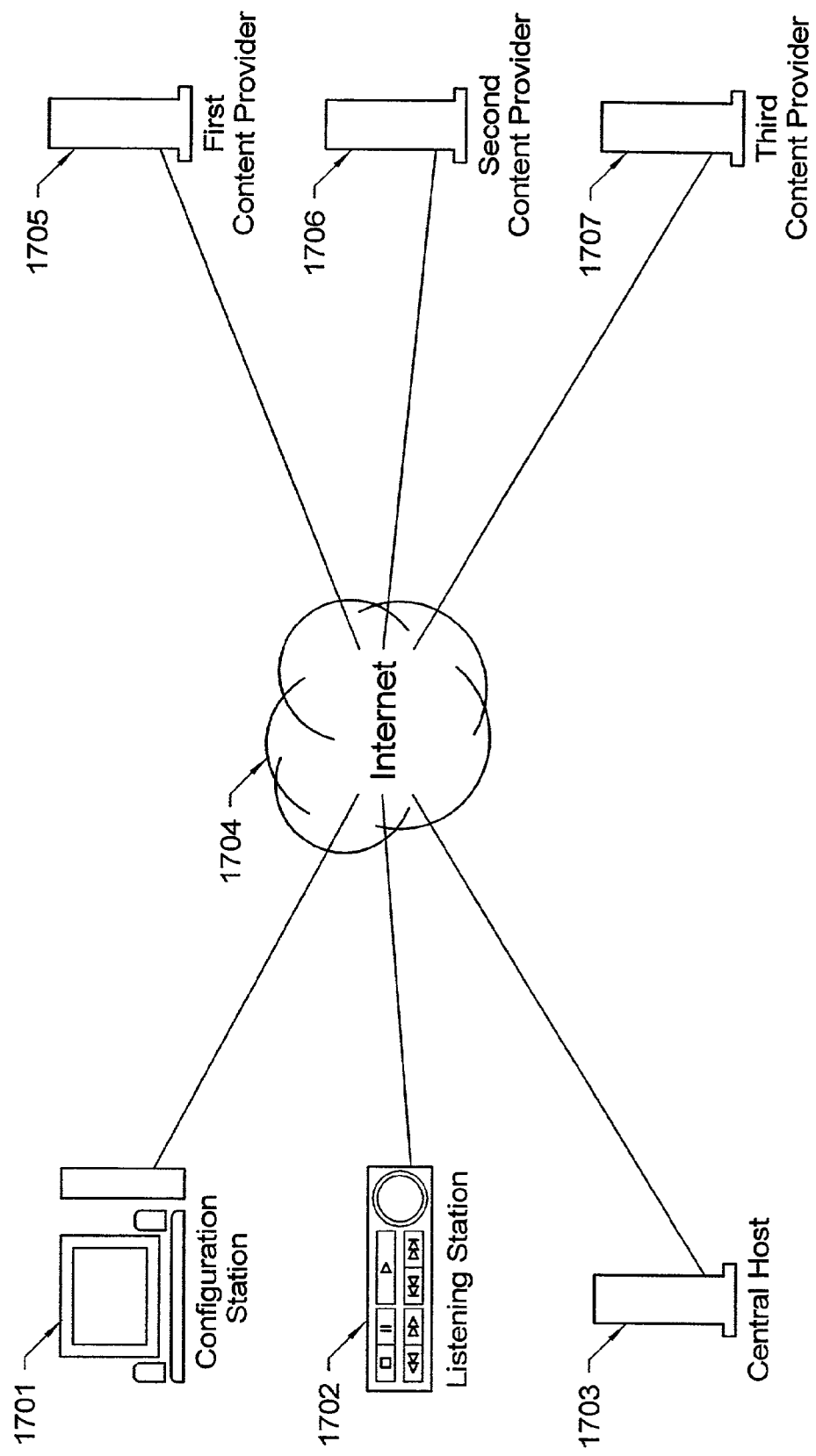

FIG. 17 shows an alternative method to listen, for example, to the audio for a created program. The steps for submitting audio segment references, and creating and audio program would be similar to those described in FIG. 16 above. However, the audio would be received through a Listening Station 1702, so the user would not need to be at a computer to listen to the created audio program. A variety of methods could be utilized to accomplish this, such as the following:

Listening Station 1702 could request the desired program from Central Host 1703, receive an updated program, and directly contact the Content Sources to request the audio segments, just as Configuration and Listening/Viewing Station 1601 had in FIG. 16 above.

Listening Station 1702 could request Configuration Station 1701 to request the desired program from Central Host 1703 and also that Central Host 1703 send the updated program directly to Listening Station 1702, and Listening Station 1702 would then directly contact the Content Sources to request the audio segments.

Listening Station 1702 could request Configuration Station 1701 to request the desired program from Central Host 1703, and Central Host 1703 would provide the updated program back to Configuration Station 1701, and Configuration Station 1701 would contact the Content Sources directly, to request the audio segments, which would be sent to Configuration Station 1701, and Configuration Station 1701 would relay the audio segments to Listening Station 1702.

Buttons on Listening Station 1702 would permit control over the playback of the audio segments, as described for FIG. 15 above. A display could be provided on Listening Station 1702 to provide playback information, such as that shown in FIG. 15.

Other configurations are possible, and would be obvious to those skilled in the art of network programming.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method for creating and playing a customized program while connected to a data communications network, comprising:
   a) storing media references in a storage means connected to said data communications network, each media reference providing descriptive information and an address to locate corresponding media content on media servers connected to said data communications network, said media servers comprising:
   means to store archived media segments each having predetermined durations and received through a media stream which for a user can be started at an arbitrary offset from the beginning of one of the archived media segments and said media stream can be paused and resumed as desired by said user, and/or
   means to produce a continuously-playing live broadcast media stream that is simultaneously broadcast to any number of users and therefore cannot be paused or controlled by individual users,
   b) providing means for a plurality of users to create and store their own customized programs, including:
   means for each user connected to said data communications network to examine the media references stored in said media reference storage means,
   means for each user to build and store onto a shared schedule server their own customized program by selecting the media references for the desired archived media segments and live broadcast media streams, and by specifying a start time or sequence position for each desired archived media segment and/or live broadcast media stream and a maximum play duration for each desired archived media segment and/or live broadcast media stream,
   c) providing means for receiving and playing a plurality of media streams, including:
   means to enable said users to uniquely identify themselves to said shared schedule server,
   means for said shared schedule server to select each said uniquely identified user's said stored customized program,
   means to receive and play the media streams for each said user, according to said selected stored customized program,
   means to interrupt the playing of a first media stream with a second media stream if said second media stream is scheduled to start before the playing of said first media stream has completed, and means to automatically resume playing said interrupted first media stream when the playing of said interrupting second media stream is completed,
   whereby each said user's customized program can include predetermined start times and maximum play durations of both the continuously-playing live broadcast streaming media and the archived media segments, so that the receiving of the customized program can be entirely automatic and not require manual intervention to start, stop, or resume any type of media, and
   whereby said users can access their customized programs and immediately receive and simultaneously play their corresponding media streams using any media stream receiving and playing means connected to said data communications network without the need for advance downloads of media content.

2. A method as claimed in claim 1, wherein, when automatically resuming play of an interrupted archived media segment, the offset used begins earlier in said media segment than when said interruption occurred, whereby an interrupted word or sentence can be heard in its entirety.

3. A method as claimed in claim 1, wherein a repeat interval can be specified for said selected media references used to build said customized program, whereby a single entry in said customized program can result in the playing of the corresponding media stream only at predetermined intervals and for predetermined durations, even for continuously-playing live broadcast media streams.

4. A method as claimed in claim 1, wherein said shared schedule server includes means to maintain a record of which of the archived media segments each said user has played along with the offsets to which partially-played media segments have been played, whereby each said user can stop receiving a partially-played archived media segment and later, from the same or a different media stream receiving and playing means, automatically resume receiving said partially-played archived media segment.

5. A method as claimed in claim 1, wherein each said user can store a plurality of said customized programs, said customized programs assigned specific times-of-day and days-of-week when they will be automatically utilized, whereby each said user can create customized programs suitable for different times of the day, or days of the week, and automatically receive these at the assigned times.

6. A method as claimed in claim 1, wherein said users can store a plurality of said customized programs, said customized programs available for said users to manually select when playing their media streams.

* * * * *